(12) United States Patent
Weller et al.

(10) Patent No.: US 7,386,289 B2
(45) Date of Patent: Jun. 10, 2008

(54) MICROWIRELESS INTEGRATED ENVIRONMENTAL SENSOR AND TRANSMITTER SYSTEM

(75) Inventors: Thomas Weller, Lutz, FL (US); David Fries, St. Petersburg, FL (US); Thomas Ketterl, Tampa, FL (US)

(73) Assignee: University of South Florida, Tampa, FL (US)

( * ) Notice: Subject to any disclaimer, the term of this patent is extended or adjusted under 35 U.S.C. 154(b) by 271 days.

(21) Appl. No.: 10/906,114

(22) Filed: Feb. 3, 2005

(65) Prior Publication Data
US 2006/0172714 A1    Aug. 3, 2006

Related U.S. Application Data

(63) Continuation of application No. PCT/US03/24268, filed on Aug. 4, 2003.

(60) Provisional application No. 60/319,449, filed on Aug. 3, 2002.

(51) Int. Cl.
*H04B 7/00* (2006.01)
*H04B 1/06* (2006.01)
*G08C 19/22* (2006.01)

(52) U.S. Cl. .............. 455/254; 455/256; 455/333; 455/226.1; 455/359; 340/870.07

(58) Field of Classification Search .............. 455/123, 455/525.1, 557, 558, 333–334, 556.1, 414.1, 455/90.3, 550.1, 91, 130, 120.1, 226.1, 228, 455/232.1, 233.1, 254, 256, 267–268, 224, 455/280–281, 344–345, 354–355; 340/820.07, 340/539.22, 572.1, 539.26, 688, 632, 540–541; 287/678, 924; 361/820
See application file for complete search history.

(56) References Cited

U.S. PATENT DOCUMENTS

| | | | |
|---|---|---|---|
| 6,452,499 B1 | 9/2002 | Runge et al. | |
| 6,546,268 B1 | 4/2003 | Ishikawa et al. | |
| 6,617,963 B1 * | 9/2003 | Watters et al. | 340/10.41 |
| 6,734,797 B2 * | 5/2004 | Shanks et al. | 340/572.4 |
| 6,806,808 B1 * | 10/2004 | Watters et al. | 340/10.41 |
| 6,864,802 B2 * | 3/2005 | Smith et al. | 340/870.07 |
| 7,034,677 B2 * | 4/2006 | Steinthal et al. | 340/539.12 |
| 7,088,964 B2 * | 8/2006 | O | 455/90.3 |
| 7,148,803 B2 * | 12/2006 | Bandy et al. | 340/539.16 |
| 7,209,042 B2 * | 4/2007 | Martin et al. | 340/572.8 |
| 2006/0019373 A1 * | 1/2006 | Kahlman et al. | 435/287.2 |

* cited by examiner

*Primary Examiner*—Pablo N. Tran
(74) *Attorney, Agent, or Firm*—Molly L. Sauter; Smith & Hopen, P.A.

(57) ABSTRACT

The invention is a microminiature wireless environmental sensor that has integrated both sensor and transmitter functions into one function. The basic operating principle for the device is that variable components of an RF circuit can be interfaced to the outside world environmental signals resulting in proportional changes in the transmission characteristics or transmission of data/bits from the RF transmitter circuit. This utilization of environmentally sensitive variable elements within a wireless transceiver circuit permits the fusion of both sensor and communications function into an integrated single function.

23 Claims, 5 Drawing Sheets

MICROWIRELESS INTEGRATED ENVIRONMENTAL SENSOR AND TRANSMITTER SYSTEM

RELATED U.S. APPLICATIONS

This application is a continuation of International Application No. PCT/US03/24268, filed on Aug. 4, 2003, which claims the benefit of U.S. Provisional Patent Application Ser. No. 60/319,449 filed Aug. 3, 2002.

GOVERNMENT SUPPORT

This invention was supported, in whole or in part, by grant Number N0001 A-98-1-0848 from the Office of Naval Research. The Government has certain rights in the invention.

BACKGROUND OF THE INVENTION

This invention relates to a wireless sensor and communications system, and more particularly, a wireless integrated microsystem for wirelessly transmitting environmental data at radio frequencies.

The gathering, distribution, and dissemination of data is an integral part of virtually every industrial process. A common means for performing data gathering and analysis is provided through use of data sensors. Data sensors provide versatile functionality to nearly every major industry, providing status information, allowing for the performance of various control functions, and often defining the means by which various elements communicate. Moreover, most electronic systems in use today employ the use of data sensors as an essential building block, often providing the backbone for overall system performance.

Major advancements in circuit fabrication techniques, as well as recent growth and interest in microelectromechanical systems (MEMS) and nanotechnology, have significantly increased the potential for sensor implementation in system architectures. Developers have been finding new ways to incorporate data sensors to increase functional flexibility by implementing sensor technology with communication systems, allowing for wireless and remote sensing capabilities. Until recently, many system architectures have performed multiple functions, such as sensing and communication, but have been limited to split architectures, whereby sensing and communication, for example, were performed separately. This is due, in a large part in the sensitivity in communications equipment, especially wireless and radio frequency elements, to interference and power limitations, as well as fabrication and process tolerance limitations. However, with recent advancements in batch fabrication process technology, as well as the ever-increasing desire to realize system on chip (SoC) architectures, the limitations to split chip circuit design are slowly being resolved. In fact, Wireless Integrated MicroSystems (WIMS) is a science wholly dedicated to the techniques of developing integrated information-gathering circuits, which are capable of interfacing electronics with the non-electronic world. Thus, with the development of SoC technology, there has been a natural evolution of traditional integrated circuit sensing devices composed of only electronic devices, to MEMS and microsystem sensors which utilize mechanical transducers in conjunction with electrical components. Some measures have been employed in the art to address the need for environmentally sensitive sensors that can communicate data wirelessly.

U.S. Pat. No. 6,546,268 to Ishikawa describes a glucose sensor based on ball integrated circuit technology mounted with sensor media operable for sensing biochemical molecules. The ball semiconductor sensor (100) has circuitry comprising an RF antenna coil (118), and RF rectifier-smoother (121), an RF amplifier (122), and control logic (124). The sensor communicates to a pump actuator or to an externally located radio frequency transmitter/receiver. However, sensing function and communication function are two separate, distinct functions.

U.S. Pat. No. 6,452,499 to Runge describes an atmospheric precipitation sensor system that communicates sensor data to a receiving unit. An environmental sensor (2) is connected to a transmitter control circuit (4). Transmitter control circuit (4) is connected to a transmitter (6), for transmission of data signal wirelessly to a receiver module, which controls an irrigation system. In the system described in the Runge patent, sensing function and transmitting functions are two separate functions.

Another problem in the existing art is that of power consumption due, in a large part, to the split sense and transmit functional architecture. For many of these systems, the external communication system limits the applicability of the sensor system, due to the inefficiency of the split architecture approach. As a result, there is an unfulfilled need in the current art to combine the sensor as part of the radio frequency communication circuit to increase the efficiency, thereby increasing the applicability of the sensor communication platform.

A heretofore-unfilled need exists for a sensor element that is integrated as part of the communication system, whereby said sensor element provides functionality within the communication system based on the sensed condition. This sensed condition causes the sensor element to interact with the communication system to modify the characteristics of the output signal of the communication system. Thus, the sensor element is no longer a separate element from the communication system, but an integrated device, which results in the fusion of the sensor and communication functions into one integrated single function. Another need exists for a sensor system integrated as a radio frequency integrated circuit element for providing an output signal indicative of a sensed condition, when exposed to environmental stimuli.

In addition, manufacturers currently need to provide some interactive means coupling the output of the sensor to the transmitter circuitry, requiring the need for control systems and external interconnects, thereby requiring additional post-process manufacturing. The required control circuitry and external interconnects of split function architectures increase the overall power consumption which, in nearly all applications, is an important factor in limiting overall system functionality.

Therefore, it is to the effective resolution of the aforementioned problems and shortcomings of the prior art that the present invention is directed.

However, in view of the prior art at the time the present invention was made, it was not obvious to those of ordinary skill in the pertinent art how the identified needs could be fulfilled.

SUMMARY OF THE INVENTION

The present invention is a sensor and sensor system comprising radio frequency integrated circuit means adapted as an environmental microsystem for the sensing of environmental stimulus and communication thereof. The system includes a sensor element integrally coupled to the radio frequency integrated circuit to provide functional means to the radio frequency integrated circuit. The sensed data is transmitted through the output port, which is integrally formed as part of the radio frequency integrated circuit. The overall system combines sensor and communication functions as a single integrated function to provide data for the surrounding environment in which the system is employed.

An inherent advantage of providing a system in which sensor and communication functions are integrated as a single function is that circuit manufacturers would be able to integrate sensor elements as part of the communication circuitry, thereby eliminating the need for separate manufacture processes to achieve the same purpose.

This environmentally sensitive telemetry circuit can be applied to wireless sensors in the radio frequency atmosphere and acoustics-underwater spheres. Furthermore, the scaling of the device can be miniaturized to permit access to new environmental phenomena at the micro and nano scale.

The use of a more compact integrated wireless environmental sensor has many applications: as a wireless mechanical sensor, a wireless microphone, a wireless temperature sensor, a wireless pressure sensor, a wireless chemical sensor, and modified with the proper recognition chemistry, a wireless biochemical sensor.

The fundamental operating principle for the microwireless integrated environmental sensor and transmitter system described herein, is that components of a radio frequency circuit can be interfaced to environmental signals resulting in predetermined changes in the transmission characteristics or transmission of data from the radio frequency transmitter circuit. This integration of environmentally sensitive elements within a wireless transceiver circuit permits the fusion of both sensor and communication functions into a single function.

The sensor element may comprise a mechanical means interactively coupled with the surrounding environment and adapted such that changes in the environmental surroundings of the sensor element results in changes in the mechanical parameters or position of the mechanical means. In addition, the mechanical means may be electromagnetically coupled to at least one of the elements the radio frequency integrated circuit, whereby the electromagnetic coupling would substantially modify at least one electrical property of the element for tuning of said radio frequency integrated circuit. The resulting radio frequency integrated circuit may be operable as a communications system, or a building block therefore, which provides a radio frequency output comprising data indicative of a sensed condition.

Additional flexibility may be achieved by modifying the sensor element, or mechanical means thereof, to be operable as a biochemical sensor for sensing environmental data comprised of biochemical stimuli.

The sensor element, or mechanical means thereof, may also be equipped with the required material to permit operation of the sensor element as a probe device to interact with a surface for probe measurements of a surface by the radio frequency integrated circuit.

The sensor element can be scaled to attain a higher or lower frequency of operation, but can also be configured so that the output of the circuit is modulated on top of a higher frequency carrier permitting more flexibility in overall circuit size and construction.

The environmentally sensitive elements can be mixed within a transmitter circuit and can be multiplexed into arrays for expanded sensing and phased array sensing strategies.

In a preferred embodiment of the invention, a sensor element is integrally coupled to a radio frequency integrated circuit, thereby combining both telemetry function and communications function into one integrated function for providing an output signal indicative of a sensed condition. The output signal is provided by an output port integrally formed to the radio frequency integrated circuit for the wireless communication of sensed data. The sensor system is adapted as an environmental sensor for sensing at least one physical, biological, or biochemical parameter.

The sensing function is facilitated by the sensor element, which comprises a mechanical means interactively coupled to the surrounding environment in which the sensor system is employed. This mechanical means is electromagnetically coupled to at least one element of the radio frequency integrated circuit in such a way as to modify at least one electrical property of at least one element of the radio frequency integrated circuit. The interaction between the mechanical means and the integrated circuit is such that the output signal is indicative of the environmental condition sensed by the sensor element, wherein the output signal of the radio frequency integrated signal was generated by the interaction between the sensor element with the surrounding environment.

In an alternative embodiment of the invention, the sensor element, or mechanical means thereof, can be equipped with the required material to permit a part of the mechanical means to physically interact with a surface in a probe configuration, the interaction of which results in changes in the electromagnetic interaction between the mechanical means and the radio frequency integrated circuit. As in the preferred embodiment, the mechanical means is electromagnetically coupled to at least one element of the radio frequency integrated circuit in such a way as to modify at least one electrical property of at least one element of said radio frequency integrated circuit.

It is to be understood that both the foregoing description and the following detailed description are illustrative and are not restrictive of the invention as claimed. The accompanying drawings, which are incorporated in and constitute part of the specification, illustrate embodiments of the present invention and together with the description, serve to explain principles of the present invention.

These and other important objects, advantages, and features of the invention will become clear as this description proceeds.

BRIEF DESCRIPTION OF THE DRAWINGS

For a more complete understanding of the present invention and the advantages thereof, reference is now made to the following description taken in conjunction with the accompanying drawings in which.

DETAILED DESCRIPTION OF THE INVENTION

Figure 1:
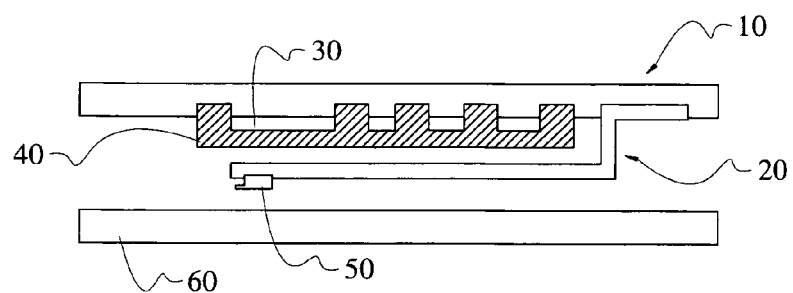
FIG. 1 is a diagrammatic view of a probe configuration.

Referring now to FIG. 1, there is an illustration of the cross section of a portion of a radio frequency integrated circuit (10), including mechanical means (20) electromagnetically coupled to a substantially coiled metal trace (30) through a dielectric means (40), all elements being integrally coupled to the radio frequency integrated circuit. In this configuration, the mechanical means is illustrated as a cantilever beam modified with the proper material (50) to be operable as a probe device for sensing environmental or physical attributes of a surface (60). The mechanical means embodied as a cantilever beam can be positionally varied by environmental or physical stimuli, which modifies the level of electromagnetic interaction between the mechanical means and the metal trace. The metal trace and mechanical means are comprised of conductive material so as to permit electromagnetic interaction therebetween. The dielectric means is integrally formed substantially between the metal trace and the mechanical means to permit and formation and maintenance of an electromagnetic field therethrough.

Figure 2:
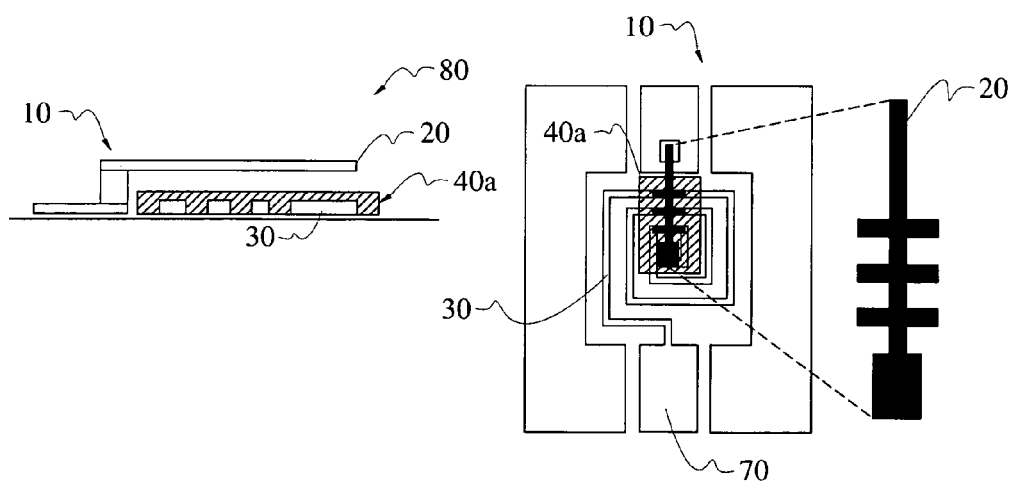
FIG. 2 is a diagrammatic view of an environmentally sensitive telemetry circuit element.

Referring now to FIG. 2, there is an illustration of both the cross section view of a portion of the radio frequency integrated circuit (10), as well as an elevation view of the same. The mechanical means (20), illustrated as a cantilever beam, is shown in greater detail as part of the elevation view. In this illustration, environmental signal input (80) is applied to the cantilever beam as shown, which causes a mechanical reaction by the cantilever beam, which modifies the electromagnetic coupling between the cantilever beam and the metal trace, through the dielectric means (40a), thereby modifying the radio frequency integrated circuit (10) output taken from the output port (70).

Figure 3:
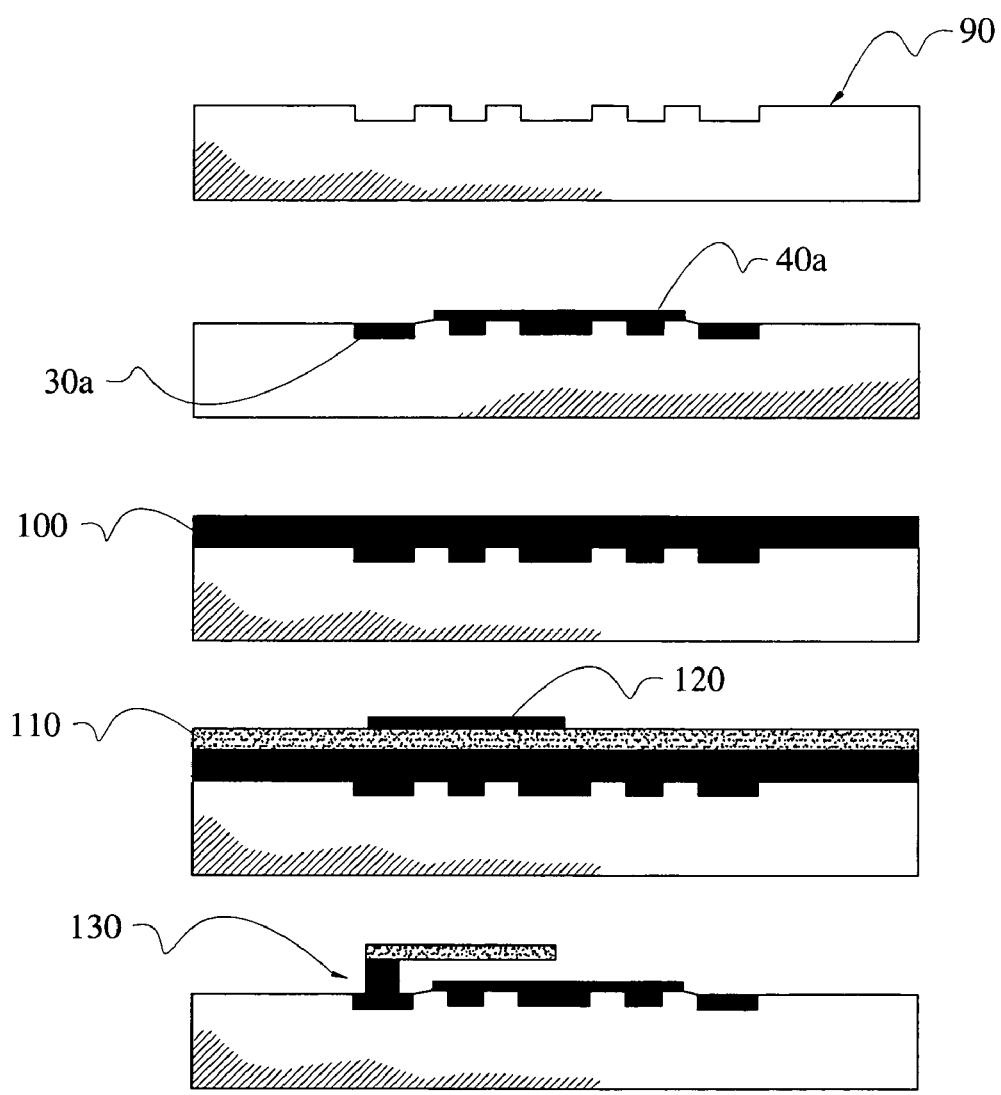
FIG. 3 illustrates the fabrication process steps of a single embodiment of the invention.

Referring now to FIG. 3, there is an illustration of sample fabrication process steps directed to a single embodiment of the invention, particularly in the formation of the sensor element portion (130) of the radio frequency integrated circuit. In this illustration, the metal trace is formed by electroplating gold (30a) on an etched pyrex substrate (90) and subsequently thermally evaporating dielectric means (40a) substantially above the coiled metal trace. Next a sacrificial photoresist layer (100) is formed, along with an additional electroplating of gold to provide a pedestal means for the mechanical means. An aluminum metal layer (110) is thermally evaporated on top the sacrificial layer, which is selectively covered with a photoresist pattern (120). The aluminum is etched, and the sacrificial layer is removed by chemical vapor deposition.

Figure 4:
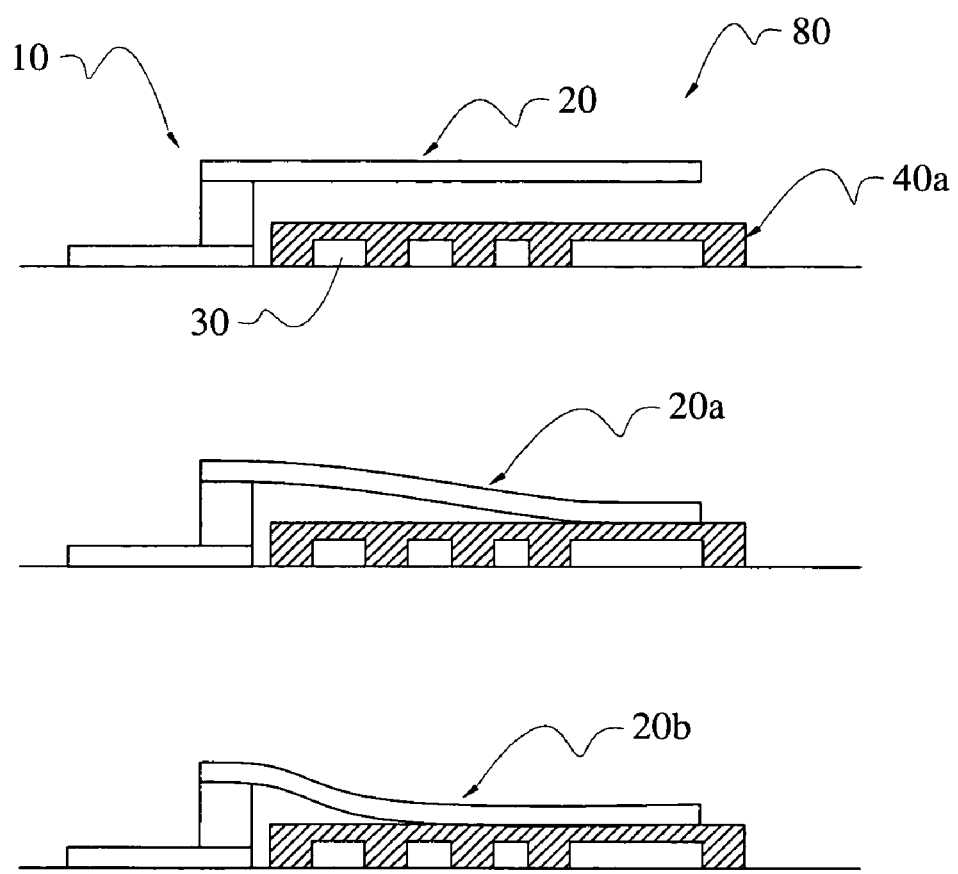
FIG. 4 is a diagrammatic view of a sensor employing the use of a cantilever beam as the mechanical means described in the preferred embodiment of the invention.

Referring now to FIG. 4, there is a diagrammatic view of the cross section of a portion of the radio frequency integrated circuit (10), including mechanical means (20) electromagnetically coupled to a substantially coiled metal trace (30) through a dielectric means (40a), all elements being integrally coupled to the radio frequency integrated circuit. In this illustration, the mechanical is shown as a cantilever beam, as one embodiment of the present invention. As an environmental signal (80) is input (in the form of environmental stimuli), the physical state of the mechanical means is deflected (20a), thereby changing the level of electromagnetic interaction with the metal trace, through the dielectric means. As further environmental stimulus is applied, additional deflection of the mechanical beam is realized (20b), resulting in a change in the electrical parameters of the metal trace through electromagnetic interaction with the beam, ultimately resulting in changes in the transmission characteristics of the portion of the radio frequency integrated circuit.

Figure 5:
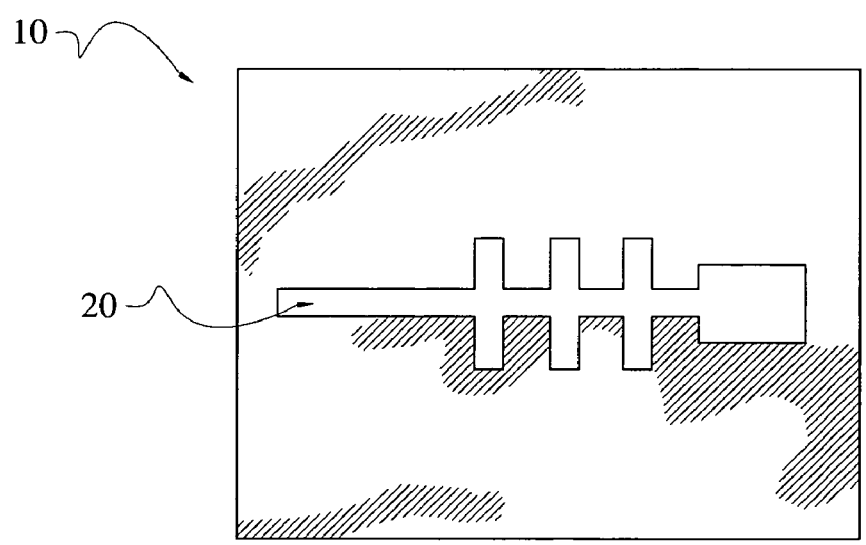
FIG. 5 is a diagrammatic view of the radio frequency integrated circuit with sensor element described in the preferred embodiment of the invention.
Figure 5:
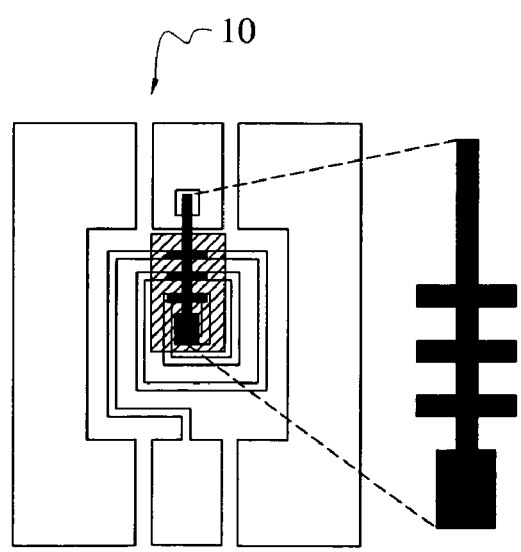

Referring now to FIG. 5, additional elevation views are shown illustrating the mechanical means of one embodiment as a cantilever beam (20), with the layers of a portion of the radio frequency integrated (10) circuit labeled respectively. In this illustration, the portion of the radio frequency integrated circuit is realized as coplanar waveguide circuit elements, with the mechanical means fabricated as a micromachined cantilever beam, as prescribed in the preferred embodiment.

Figure 6:
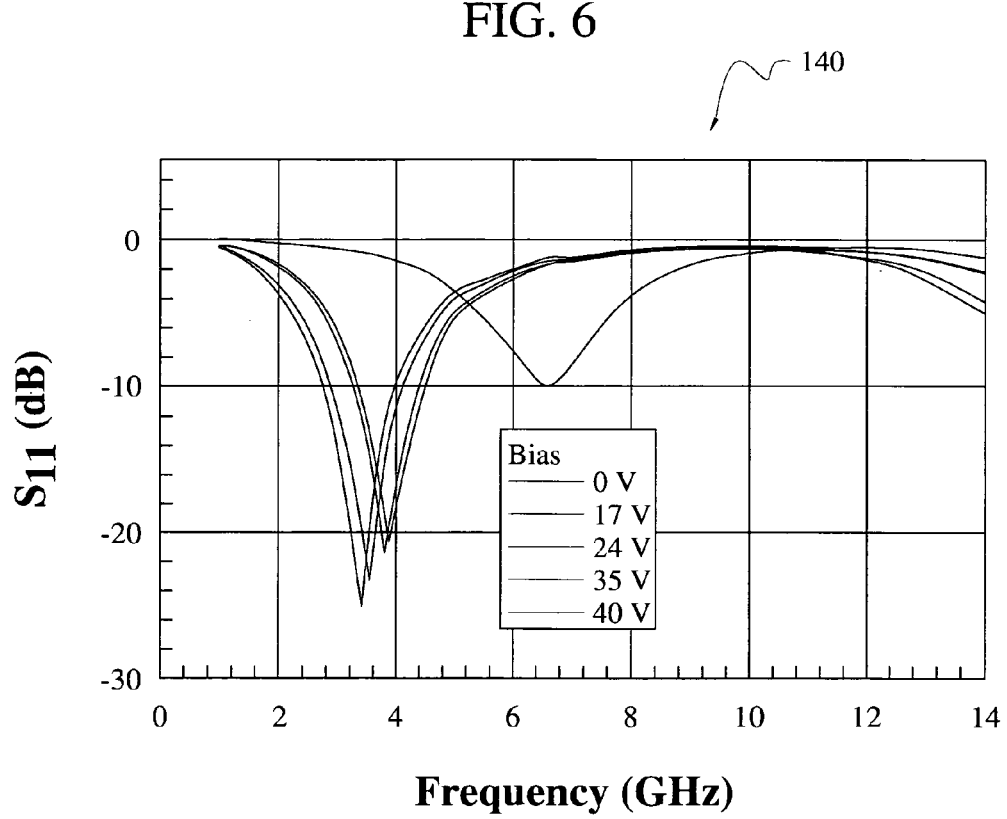
FIG. 6 is a graphic showing proposed signal output for typical environmental sensor application.

Referring now to FIG. 6, there is an illustration of sample data (140) taken at a variety of states of environmental manipulation of the cantilever beam of one embodiment and the resulting electromagnetic interaction of the mechanical means with the metal trace portion of the radio frequency integrated circuit, thereby frequency tuning of the output of the radio frequency integrated circuit. The sample data shown illustrates the manner in which the output of the circuit can be manipulated by environmental stimulus through the present invention, as a direct conversion, single function element.

In a preferred embodiment of the invention, the environmentally sensitive sensor element is a mechanical transducer element, whereby environmental changes result in mechanical manipulation of the mechanical means, thereby converting mechanical force to electrical potential through electromagnetic interaction with an element of the radio frequency integrated circuit. The radio frequency integrated circuit has an output port integrally formed such that data indicative of a sensed condition can be transmitted wirelessly from the radio frequency integrated circuit. The sensor element is fabricated as an integral part of the radio frequency integrated circuit, and provides a means for modifying the output of the circuit based on surrounding environmental stimulus, such that both sensing and transmit functions are performed as a single integrated function.

In an alternative embodiment the sensor element may be modified to act as a passive probe element for receiving direct stimulus from a surface, whereby stimulus would interact with the sensor element, thereby manipulating the level of electromagnetic interaction with the appropriate elements of the radio frequency integrated circuit to achieve the predetermined output signal of the radio frequency integrated circuit corresponding to the value of the stimulus. The radio frequency integrated circuit functions in the same manner as in the preferred embodiment, with output indicative of a sensed condition by the sensor element.

It will be seen from the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also understood that the following claims are intended to cover all of the generic and specific features of the invention herein described, and all statements of the scope of the invention, which, as a matter of language, might be said to fall therebetween. Now that the invention has been described.

What is claimed is:

1. A wireless environmental sensor system, comprising:
   a radio frequency circuit having at least one circuit element;

an environmental sensor element electromagnetically coupled to the at least one circuit element of the radio frequency circuit, whereby the electromagnetic coupling between the environmental sensor element and the at least one circuit element is modified through a response by the environmental sensor element to the sensed environment to provide a radio frequency output signal responsive to the sensed environment; and an output port integral to said radio frequency circuit for wireless communication of the radio frequency output signal.

2. The wireless environmental sensor system of claim 1, wherein said sensor element is adapted for sensing at least one physical parameter.

3. The wireless environmental sensor system of claim 1, wherein said sensor element further comprises a mechanical means interactively coupled to the surrounding environment.

4. The wireless environmental sensor system of claim 3, wherein said mechanical means is adapted for tuning said radio frequency circuit.

5. The wireless environmental sensor system of claim 4, wherein said mechanical means is electromagnetically coupled to at least one element of said radio frequency circuit, whereby environmental interactions with said mechanical means results in variations in the electrical properties of at least one of the electrical components of said radio frequency circuit for tuning of the frequency of said radio frequency circuit.

6. The wireless environmental sensor system of claim 1, wherein said sensor element is a biochemical sensor.

7. The wireless environmental sensor system of claim 6, wherein said sensor element is adapted for sensing at least one biochemical parameter.

8. The wireless environmental sensor system of claim 7, wherein said sensor element further comprises a mechanical means interactively coupled to the surrounding environment.

9. The wireless environmental sensor system of claim 8, wherein said mechanical means is adapted for tuning said radio frequency circuit.

10. The wireless environmental sensor system of claim 9, wherein said mechanical means is electromagnetically coupled to at least one element of said radio frequency circuit, whereby biochemical interactions with said mechanical means results in variations in the electrical properties of at least one of the electrical components of said radio frequency circuit for tuning of the frequency of said radio frequency circuit.

11. A wireless environmental sensor system, comprising:
a radio frequency circuit comprising at least one coiled metal trace;
a mechanical environmental sensor element electromagnetically coupled to the at least one coiled metal trace of the radio frequency circuit, whereby the electromagnetic coupling between the environmental sensor element and the at least one coiled metal trace is modified by a mechanical response of the environmental sensor element to the sensed environment to provide a radio frequency output signal responsive to the sensed environment; and an output port integral to said radio frequency circuit for wireless communication the radio frequency output signal.

12. The wireless environmental sensor system of claim 11, wherein said mechanical means is interactive with the surrounding environment.

13. The wireless environmental sensor system of claim 11, wherein a dielectric means is fabricated substantially above said metal trace, wherein said dielectric means is in direct contact with at least a portion of said metal trace.

14. The wireless environmental sensor system of claim 13, wherein mechanical means is located substantially above said dielectric means, said mechanical means electromagnetically coupled with at least a portion of said metal trace, thereby creating an electromagnetic field path within said dielectric means.

15. The wireless environmental sensor system of claim 11, wherein said electromagnetic field substantially modifies at least one electrical property of said metal trace.

16. The wireless environmental sensor system of claim 11, wherein said output signal is substantially dependent on the electrical properties of said metal trace, whereby said output signal varies in relation to variation in the electrical properties of said metal trace.

17. A wireless environmental sensor, comprising:
a sensor element comprising a mechanical means interactive with the surrounding environment, said mechanical means operable as means for toning a radio frequency circuit;
a substantially coiled metal trace electromagnetically coupled to said sensor element;
a dielectric means integrally formed substantially above said metal trace, whereby at least a portion of said dielectric means is in direct contact with at least a portion of said metal trace for maintenance of an electric field therethrough.

18. The wireless environmental sensor of claim 17, wherein said mechanical means is located substantially above said dielectric means, said mechanical means electromagnetically coupled with at least a portion of said metal trace, thereby creating an electromagnetic field path within said dielectric means.

19. The wireless environmental sensor system of claim 18, wherein said electromagnetic field substantially modifies at least one electrical property of said metal trace.

20. The wireless environmental sensor of claim 18, further comprising an output port means for communicating data sensed by said sensor element.

21. The wireless environmental sensor of claim 20, further comprising an output signal for wirelessly communicating data from said output port.

22. The wireless environmental sensor of claim 18, wherein said sensor element is adapted for sensing at least one environmental parameter.

23. The wireless environmental sensor of claim 18, wherein said sensor element is adapted for sensing at least one biochemical parameter.

* * * * *